(12) United States Patent
Ericson et al.

(10) Patent No.: US 8,838,160 B2
(45) Date of Patent: Sep. 16, 2014

(54) GATING CONTROL LOOP TECHNIQUE FOR OPTIMIZING PERFORMANCE IN A WIRELESS COMMUNICATION NETWORK

(75) Inventors: Marten Ericson, Lulea (SE); Jan Christoffersson, Lulea (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 426 days.

(21) Appl. No.: 12/995,293

(22) PCT Filed: Jun. 2, 2008

(86) PCT No.: PCT/SE2008/050640
§ 371 (c)(1),
(2), (4) Date: Nov. 30, 2010

(87) PCT Pub. No.: WO2009/148366
PCT Pub. Date: Dec. 10, 2009

(65) Prior Publication Data
US 2011/0076969 A1    Mar. 31, 2011

(51) Int. Cl.
*H04B 7/00*    (2006.01)
*H04W 4/20*    (2009.01)

(52) U.S. Cl.
CPC ........................................ *H04W 4/20* (2013.01)
USPC .............................. 455/522; 455/69; 370/252

(58) Field of Classification Search
USPC .............. 455/522, 69, 450, 67.11, 24, 456.5,
455/456.6, 424, 425, 452.2, 91, 13.4, 76,
455/260, 445, 426.2, 435.1, 258, 183.1,
455/316, 430, 572; 370/335, 329, 252, 342,
370/345, 469, 528, 311, 349, 318, 336, 392,
370/471, 466, 401, 201, 353, 249, 352, 356,
370/230, 395.21, 390, 432
See application file for complete search history.

(56) References Cited

U.S. PATENT DOCUMENTS

| | | | |
|---|---|---|---|
| 7,085,254 B1 * | 8/2006 | Yun et al. | 370/342 |
| 2003/0040283 A1 * | 2/2003 | Kawai et al. | 455/67.1 |
| 2004/0259584 A1 * | 12/2004 | Murata et al. | 455/522 |
| 2005/0043051 A1 * | 2/2005 | Takano et al. | 455/522 |
| 2006/0058055 A1 * | 3/2006 | Shintani | 455/522 |
| 2007/0189237 A1 * | 8/2007 | Jaatinen et al. | 370/335 |
| 2008/0049683 A1 * | 2/2008 | Nakamata et al. | 370/335 |
| 2008/0181127 A1 * | 7/2008 | Terry et al. | 370/252 |
| 2008/0293426 A1 * | 11/2008 | Kim et al. | 455/450 |

FOREIGN PATENT DOCUMENTS

| | | |
|---|---|---|
| EP | 1420538 A1 | 5/2004 |
| WO | 00/62456 | 10/2000 |
| WO | 00/74292 A1 | 12/2000 |
| WO | 2007/017733 A2 | 8/2006 |
| WO | 2008/023241 A2 | 2/2008 |

* cited by examiner

*Primary Examiner* — Golam Sorowar
(74) *Attorney, Agent, or Firm* — Coats & Bennett, PLLC (57) ABSTRACT

A gating scheme in a wireless communication network is tuned according to the performance of the application used. This can mean that in some situations gating is not used at all while in other occasions gating is used where the cycle length, burst length, number of preambles and offset are adjusted. The performance is monitored and the gating is increased or decreased depending on the results of the monitoring and demands of the application. Furthermore, the gating scheme adapts to the current performance and is chosen to optimize performance in terms of system capacity. The monitoring also takes into account which of the gating cycles that needs to be changed. The algorithm is self tuning/configuring meaning that it will control the gating scheme to find and keep an optimal level for the used application.

18 Claims, 5 Drawing Sheets

GATING CONTROL LOOP TECHNIQUE FOR OPTIMIZING PERFORMANCE IN A WIRELESS COMMUNICATION NETWORK

TECHNICAL FIELD

The present invention is related to signalling in wireless communication networks. More specifically it is related to control signalling activity in a wireless communication network.

BACKGROUND OF THE INVENTION

In modern telecommunication networks where transmission conditions on radio channels are changing rapidly while ever higher data rates are to be achieved it is among others important to be able to adjust the transmission power in order to accurately follow these changes and to ensure efficient use of the available transmission capacity. However, frequent changes of transmission power require frequent control signalling which may increase the signalling overhead and thereby interference. As a consequence, the capacity for data transmission may be decreased.

One way of tackling the problem of signalling overhead in modern wireless communication networks is the principle of gating. In short, gating means that control signals adjusting the power on the radio channel are sent only periodically. In this fashion, interference on the radio channel may be reduced and its capacity increased. Specifically on the uplink, i.e., between a mobile terminal (UE) and a base station, gating may increase the battery time of the UE and therefore the time available for data transmission and voice conversation.

For instance in the WCDMA/HSPA 3GPP R7 (Third Generation Partnership Project Release 7), gating of the UL DPCCH (Uplink Dedicated Physical Control Channel) is introduced and named UE DTX. Also control signals which are normally sent continuously on a separate control channel, may be sent when user data is sent on the E-DPDCH (Enhanced Dedicated Physical Downlink Channel) or HS-DPCCH (High Speed Dedicated Physical Control Channel).

As is known to the skilled person, different gating schemes yield different performance under different radio conditions and the performance is a trade off between less DPCCH overhead and good power control. Here, by performance it is meant how well the power control signalling follows the changing condition on the radio channel and how well the available transmission capacity on the radio channel is used.

Furthermore, choosing one particular scheme may lead to far from optimal performance if the channel is not as expected or if the channel changes during the session. Gating may increase transmission performance in scenarios where mobile terminals move at low speed in relation to the base station or base stations. At higher speeds, more intense DPCCH is necessary in order to improve the performance, since signal fading changes rapidly. It has been shown, however, that gating at very high speeds or difficult radio conditions will degrade the performance compared to not using gating.

A further difficulty when choosing gating scheme in an HSDPA scenario is that both cycle 1 and cycle 2 parameters need to be specified. In some cases, changing only one of the cycles may not change the performance, while changing both may not be optimal.

Some solutions suggested by known technology deal with the gating optimization problem by changing the length of the gating preamble, such as in U.S. provisional patent application 60/705,831. Others attempt using gating in combination with channel quality reports received from one or more UEs, such as in the US patent application 20070030828.

These and other disadvantages related to known technology are at least in part solved by the present invention.

SUMMARY OF THE INVENTION

Embodiments herein include a method for communication in a wireless communication network, comprising the steps of:
selecting a parameter characterizing a service used on a radio channel in the wireless communication network;
selecting a target parameter value adapted for the service;
determining a current parameter value indicative of the current transmission conditions for the service on the radio channel;
comparing the current parameter value to the target parameter value;
adjusting control signalling activity associated with the service on the radio channel based on the comparison and;
transmitting information indicative of the adjustment of the control signalling activity on the radio channel.

In this fashion, the method ensures that different services used over the radio channel of a wireless communication network are treated differently, i.e. have different target parameter values. Thus control signalling becomes more flexible, more service specific and unnecessary performance degradation due to inaccurate control signalling is reduced. This, in turn, leads to less interference on the radio channel, better following the actual transmission conditions over the radio channel and less power consumption in the network unit performing control signalling.

One other aspect of the method according to the present invention is related to a method for communication in a wireless communication network, comprising the steps:
selecting a parameter characterizing a service used over a radio channel in the wireless communication network;
selecting a target parameter value adapted for the service;
determining a current parameter value indicative of the current transmission conditions for the service on the radio channel;
comparing the current parameter value to the target parameter value;
adjusting a signalling activity associated with the service on a separate control channel based on the comparison and;
transmitting information indicative of the adjustment of the signal activity on the control channel.

The advantage of this aspect of the method is that control signalling according to the present invention may be performed separately from data transmission on the radio channel. This is especially useful if the method is to be implemented into existing wireless communication networks, where control signalling is often performed in this fashion.

Yet another aspect of the present invention is related to a mobile terminal for communication in a wireless communication network, comprising:
a receiver/transmitter combination for transmitting data related to a service on a radio channel in the wireless communication network;
a measurement unit configured for measuring values indicative of the transmission conditions over a radio channel in the wireless communication network;
control unit for adjusting control signalling activity over the radio channel;

a processing unit configured for selecting a parameter characterizing the service and for determining a current parameter value based on the measured value received from the measurement unit and for comparing the current parameter value with a target parameter value where the target parameter value is specific for the service used by the mobile terminal over the radio channel and in that the processing unit is further configured to instruct the control unit to adjust control signalling activity on the radio channel associated with the service based on the comparison between the current parameter value and the target parameter value.

It should be noticed that the mobile terminal is well-suited for implementing the method steps according to the two aspects of the method according to the present invention mentioned earlier.

Moreover, another aspect of the present invention is related to an infrastructure node for communication in a wireless communication network, comprising:
- a receiver/transmitter combination for transmitting data related to a service over a radio channel in the wireless communication network;
- a measurement unit configured for measuring values indicative of the transmission conditions over a radio channel in the wireless communication network;
- a control unit for adjusting control signalling activity over the radio channel;
- a processing unit configured for selecting a parameter characterizing the service and for determining a current parameter value based on the measured value received from the measurement unit and for comparing the current parameter value with a target parameter value where the target parameter value is specific for the service used over the radio channel and in that the processing unit is further configured to instruct the control unit to adjust control signalling activity on the radio channel associated with the service based on the comparison between the current parameter value and the target parameter value.

As in the case of the mobile terminal according to the present invention, the infrastructure node according to the present invention is well-suited to implement the method steps of the two aspects of the method according to the present invention mentioned earlier.

Finally, another aspect of the present invention is related to a computer program comprising instruction sets for:
- selecting a target parameter value associated with a service used over a radio channel in the wireless communication network;
- determining a current parameter value indicative of the current transmission conditions on the radio channel;
- comparing the current parameter value to the target parameter value;
- adjusting power control signalling associated with the service based on the comparison and;
- communicating the adjustment of power control signalling on a control channel.

DETAILED DESCRIPTION OF PREFERRED EMBODIMENTS

Figure 1:
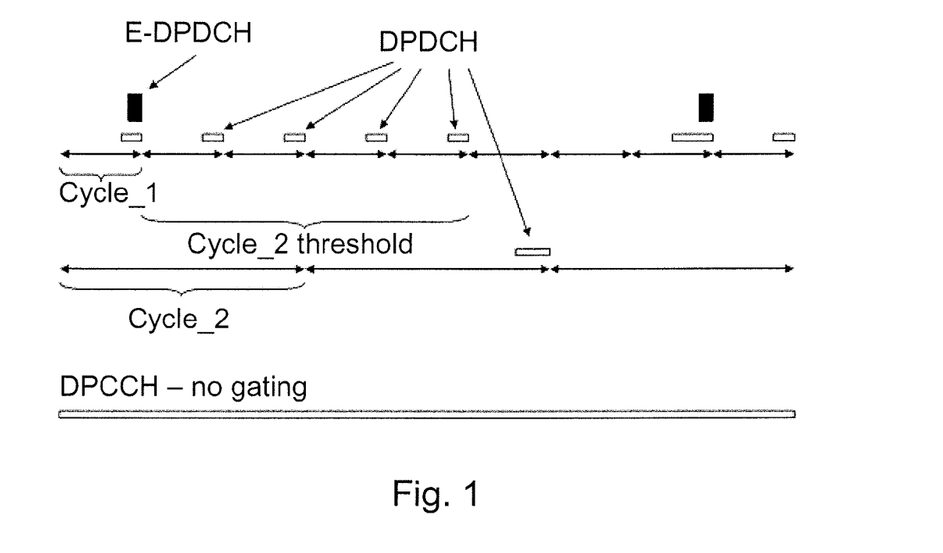
FIG. 1 illustrates a gating scheme according to 3GPP R7 with two different cycle and burst lengths.

According to the 3GPP R7 specification and also schematically seen in FIG. 1, the gating scheme in an HSDPA scenario follows two different cycles with different cycle lengths and burst lengths, meaning two different signalling periods and two different lengths of the signalling block. After an initial E-DPDCH transmission illustrated as a black vertical rectangle, cycle 1 is used until a timer (cycle_2 threshold) expires and a transition to cycle 2 is done. Control signalling in FIG. 1 is illustrated by the white horizontal rectangles. The UE remains in cycle 2 used until the next E-DPDCH transmission occurs. A new E-DPDCH transmission triggers a switch back to cycle 1. Typically, cycle 2 has less intense DPCCH activity. In cycle 2, it is also possible to use a longer preamble than what is available in cycle 1. For applications with periodic transmissions such as VoIP (Voice-over-IP), cycle 1 can be tuned to give long preambles for the periodic E-DPDCH transmissions. The gating schemes and the two gating cycles are illustrated in FIG. 1.

Figure 2:
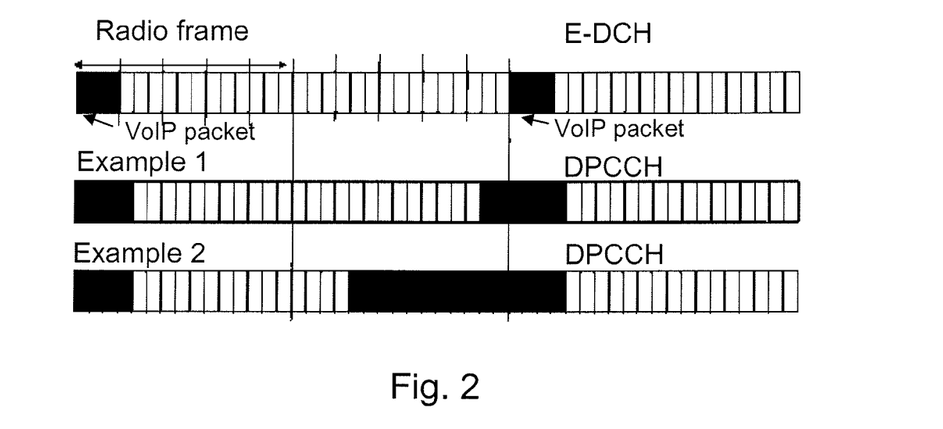
FIG. 2 illustrates two different gating schemes according to known technology tailored for a VoIP service.

In FIG. 2, different gating schemes (for cycle 1) tailored for VoIP are illustrated. If gating is not used, continuous transmission of the DPCCH is used (not shown). Different gating schemes can be more or less intense, meaning that the DPCCH signalling activity is lower or higher. In FIG. 2, two gating schemes are shown, one with a 2 slot preamble (example 1 with hardest possible gating/low DPCCH activity) and one with an 11 slot preamble (example 2 with higher DPCCH activity).

These different gating schemes give rise to different levels of overhead and power control accuracy. Moreover, gating updates or preambles are necessary to keep the closed loop power control accurate, even under good channel conditions.

Figure 3:
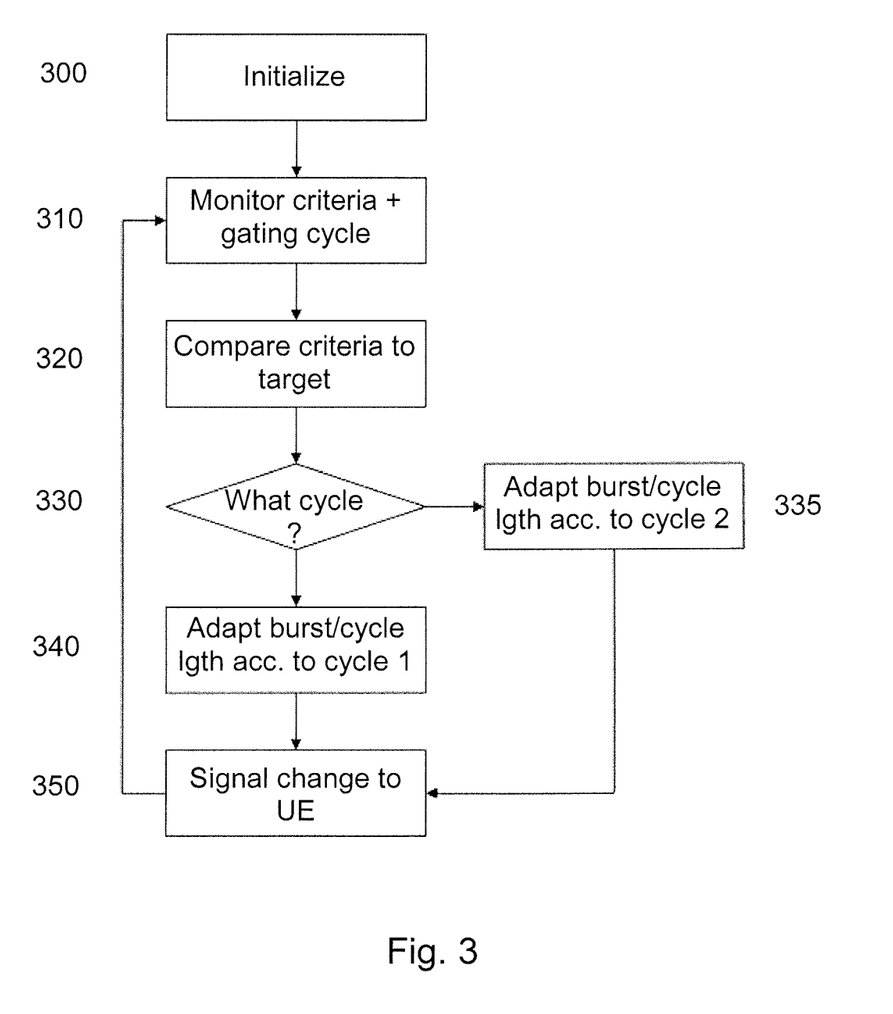
FIG. 3 illustrates the steps of a method according to one embodiment of the present invention.

FIG. 3 depicts the steps according to one embodiment of method of the present invention. Although the embodiment herein focuses on the implementation of the method in a base station operating in an HSDPA network, it may be equally implemented in another node in some other wireless communication network, where different data services are used and where control signalling is performed to follow changes in transmission conditions on the radio channel. Additionally, the method according to the present invention may also be implemented in the mobile terminal UE.

Returning to FIG. 3, the base station selects at step 300 a parameter characterizing the transmission conditions on the radio channel. Among the parameters available, some possible choices may be BLER (Block Error Rate), BER (Bit Error Rate), CIR (Carrier-to-Interference Ratio), SIR (Signal-to-Interference Ratio), SINR (Signal-to-Interference and Noise Ratio) maximum number of retransmissions or other parameters.

Whichever parameter that is chosen at step 300, a target value of the parameter is used which is specific for the service used over the radio channel. Thus, if for example, the BLER parameter is chosen, its target value for VoIP applications may differ from the target BLER value for interactive type traffic, such as web browsing, file download and others. The choice of the target parameter value may be for example tied to the detection of the type of traffic the base station is about to send to the UE.

Additionally, a gating cycle is chosen (cycle 1 in an HSDPA implementation) and its burst length, cycle length, preamble length and offset are set to predefined values. Depending on the target parameter value chosen and the type of data traffic transmitted over the radio channel used the initial length of the gating preamble may be 0 (thus gating without preamble) or some other initial value. By the same token, no gating may be chosen initially.

Thereafter, at step 310, the current parameter value is determined and the gating cycle is monitored. This may be done continuously, at given time instants or intermittently, as preferred. One example way of determining the parameter value may be using CQI (Channel Quality Indicator) reports, ACK/NACK messages received from one or more UEs in the coverage area of the base station, RSSI (Received Signal Strength Indicator) or other means.

At the next step, at 320, the determined parameter value is compared to the service specific target value of the parameter, such to a target BLER, CIR or other value. The determined parameter value used in the comparison to the service specific target value may be an average value over several previously determined parameter values, an instantaneous parameter value determined at a predefined time instant or be determined in some other fashion before being compared to the target value.

Thereafter, at step 330, it is checked in which gating cycle the base station is operating. In this embodiment of the method according to the present invention, two gating cycles are used, namely cycle 1 with shorter cycling period and cycle 2 with longer cycling period.

Now if the base station determines at step 330 that it is operating in gating cycle 1, it adapts at step 335 the burst and/or cycle period of cycle 1 depending on the comparison between the determined parameter value and the target parameter value. If for example BLER is chosen as the parameter value, and the BLER determined is lower than the target BLER, the base station may alter the gating scheme at step 335 in order to increase the signalling on the DPCCH. In practice this may be realized as transmitting gating signals with longer burst lengths and/or shorter cycle lengths. However, depending on the service used over the radio channel, only one of the parameters may be changeable.

Otherwise, if the determined parameter value is higher than the target parameter, the base station may at step 340 alter the gating scheme for cycle 1 in order to decrease the signalling on the DPCCH (Dedicated Physical Control Channel) by decreasing the cycle length and/or the burst length for cycle 1. Also, other parameters associated with the signalling activity on the DPCCH may be changed, such as gating preamble length or gating offset, i.e. the time difference between the start of the gating on the DPCCH and the start of data transmission on the E-DPDCH. If the data service used over the E-DPDCH allows it, more than one of the parameters cycle length, burst length, preamble length or offset may be altered in order to approach the target parameter value.

It should be mentioned that in cases where the service over the radio channel has a fixed cycle period, such as, for example, VoIP, the signalling over the DPCCH is preferably altered by changing the burst length. Note however, that not only the gating scheme may be changed as a result of the monitoring of the parameter value. Also the power (offset) of the DPCCH can be changed and/or the number of TPC (Transmission Power Control) bits, i.e. the slot format, may be changed.

Similarly, if the base station determines at step 330 that is in cycle 2, it does analogous operations for cycle 2 as for cycle 1.

Note that if a switch to cycle 1 has occurred immediately before the monitoring of the parameter values at step 310, cycle 2 needs to be altered. The reason for this is that when the gating scheme is in cycle 2 and an E-DPDCH (Enhanced Dedicated Physical Downlink Channel) transmission occurs, a switch to cycle 1 is carried out immediately. Thus parameter values determined immediately before the switch to cycle 1 are related to cycle 2. Therefore, if a discrepancy between the current parameter value and the target parameter value during comparison of these values is determined, parameters for cycle 2. Cycle 2 may be altered according to what was mentioned connected with steps 335 and 340 earlier.

One reason for switching to cycle 1 when data traffic is to be transmitted on the E-DPDCH is that data on this channel is sensitive to fast fading and therefore requires more robust signalling than what cycle 2 can provide.

Finally, at step 350 the base station transmits the change in gating scheme to the UE and also the time from which the gating scheme should be active.

It should be mentioned that the method steps in the method of FIG. 3 are suitable to be implemented by a computer program operating in an internal or external memory of a base station or a mobile terminal.

Figure 4:
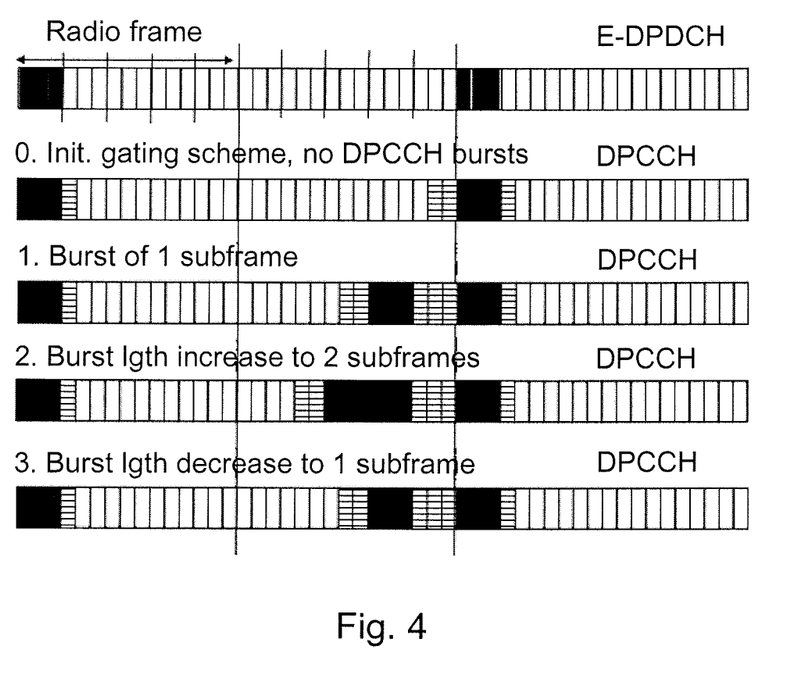
FIG. 4 illustrates a gating scheme according to one embodiment of the present invention.

Turning now to FIG. 4, an illustration of an example operation of the gating control loop according to the present invention is shown. In this example, VoIP has been chosen as the service over the radio channel and the control signal bursts have been chosen to be in cycle 1. It should be mentioned that the gating control loop according to the present invention may look differently for other services over the radio channel.

Illustrated by the uppermost bar which stands for the E-DPDCH, the length of a radio frame is indicated by the double arrow. VoIP data packets are depicted by the three black bars at the beginning of the first and third radio frame. Also, each vertical bar in each row represents one time slot.

The remaining horizontal bars represent the DPCCH, where the black vertical bars represent control signals and the shaded vertical bars post- and preambles. It can be seen in FIG. 4 that the gating occurs during the transmission of VoIP packets, i.e. DPCCH bursts are aligned to the E-DPDCH bursts (VoIP packets) by a suitable choice of offset.

Moreover, it is shown in FIG. 4 that the initial gating scheme, i.e. the gating scheme 0 besides gating following the VoIP transmissions does not contain any DPCCH bursts. Gating scheme 1, on the other hand comprises DPCCH bursts having the length of 1 subframe with a two slot preamble. If the method according to the present invention of which one embodiment was described in FIG. 3 detects that the parameter value is below the target value it may decide to increase the burst length of the gating.

In the case illustrated in FIG. 4 the burst length in the gating scheme 2 is increased by 3 slots (one sub frame) and the offset is also altered so that the burst always comes as a pre amble to the E-DPDCH burst.

However, if due to changing transmission conditions it is detected that the parameter value is now higher than the target value, the burst length is decreased by 3 slots such that the gating scheme 3 is used.

Figure 5:
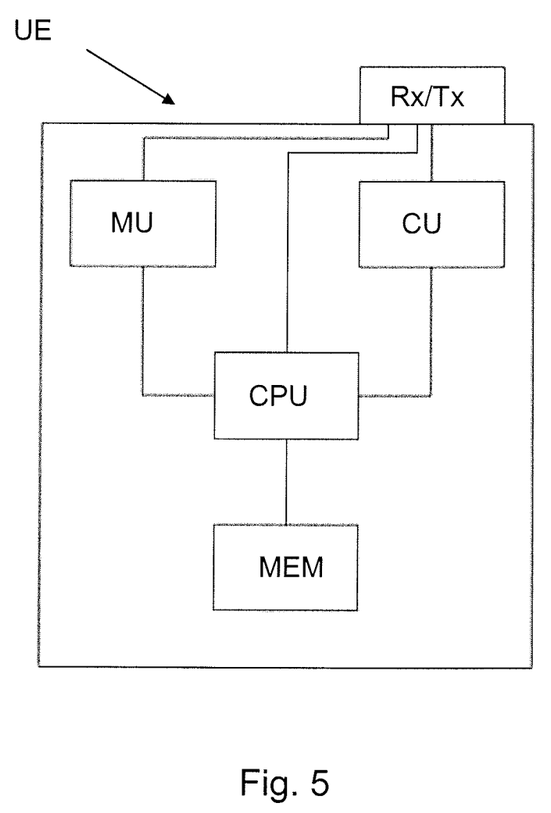
FIG. 5 illustrates a mobile terminal according to one embodiment of the present invention.

FIG. 5 illustrates a mobile terminal UE according to one embodiment of the present invention. Aside from a receiver/transmitter combination Rx/TX, the mobile terminal UE also comprises a measurement unit MU, a control unit CU, a processing unit CPU and a memory MEM.

By means of the receiver/transmitter combination Rx/Tx, the mobile terminal UE is adapted to receive data transmissions and control signals from a base station in whose coverage area the mobile terminal UE is located. More specifically, the mobile terminal UE is adapted to receive power control signalling on a control channel from a base station. However, the receiver/transmitter combination Rx/Tx may also be adapted to transmit power control signalling on an uplink control channel (such as the DPCCH in a possible HDSPA implementation) to the base station.

The measurement unit MU has the task of measuring values indicative of the transmission or reception conditions on the radio channel. Examples of such values may be the number of correctly and incorrectly received data units, the attenuation on the uplink radio channel, the received signal strength and so on.

Using these measurement values, the processing unit CPU may calculate a CQI-value indicative of the transmission conditions on the radio channel and transmit it via the receiver/transmitter unit Rx/Tx to the base station. This is, per se, known to the skilled person.

However, the processing unit CPU of the mobile terminal UE according to the present invention may also be configured to calculate parameter values from the values received from the measurement unit. These parameter values, the CPU may be configured to be compared with a predefined target value which may be specific for the service used by mobile terminal UE over the radio channel. Examples of such target parameter values may be BLER, CIR, BER and other values mentioned earlier in the description of the method steps in FIG. 3.

In case the parameter value determined by the processing unit CPU is lower than the predefined target value, the processing unit CPU is adapted to instruct the control unit CU to increase the gating activity on the uplink control channel by for example increasing the cycle period of the gating or increasing the burst length for the gating. Also, the processing unit CPU may instruct the control unit CU to increase the number of TPC bits on the uplink control channel. Another possibility may be for the processing unit CPU to instruct the receiver/transmitter unit Rx/Tx to increase the transmission power on the control channel. Likewise, the processing unit CPU is adapted to shorten the gating cycle length or to decrease the burst length for the gating or to lower the power on the control channel if the parameter value calculated by the processing unit CPU is higher than a predefined target value. The processing unit CPU may then be configured to instruct the control unit CU to transmit the information about the changed gating scenario on the uplink control channel.

It may be added that the processing unit CPU may also be adapted to use a combination of more than one of the parameters cycle period, burst length, transmission power, number of TPC or some other parameter in order to attempt to achieve the target value.

The processing unit CPU is also adapted to signal these changes in gating activity via the receiver/transmitter combination Rx/Tx to a base station in whose coverage area the mobile terminal UE is located.

Additionally, the processing unit CPU is adapted to detect the type of data traffic to be transmitted and to retrieve a target parameter value associated with the detected type of data traffic from the memory MEM. Moreover, the processing unit may be adapted to store several parameter values determined from the measurement values acquired by the measurement unit MU in the memory MEM before calculating an average parameter value and comparing with the target value.

Figure 6:
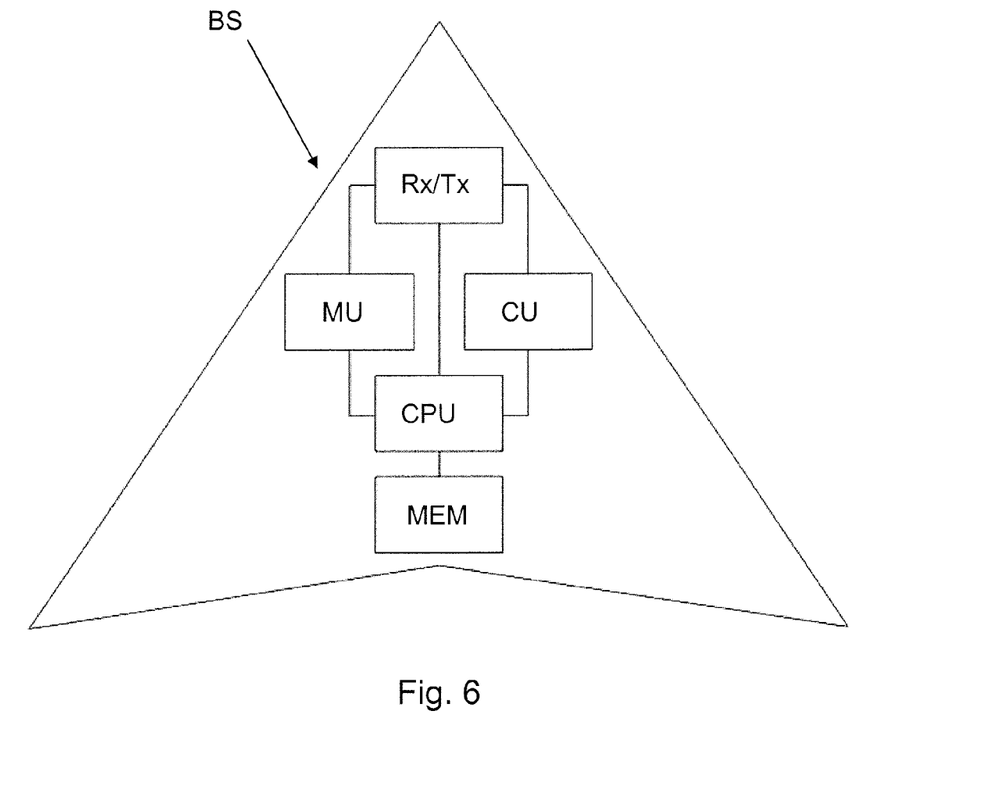
FIG. 6 illustrates a base station according to one embodiment of the present invention.

Turning now to FIG. 6, an illustration of a base station according to one embodiment of the present invention is given. It may be added that while the functionality implemented in the base station in FIG. 6 is related to an HSDPA implementation, the base station may be adapted to operate in any wireless communication network where different data services are used over a radio channel, where power control is performed on control channels and where gating of the control channel is possible.

It may also be noted that the functionality described in FIG. 6 is not limited to the implementation into a base station, but that it also may be implemented into any infrastructure node which is able to transmit and receive user and control data and to transmit and receive power control commands in order to follow the changing conditions on a radio channel.

Similar to the mobile terminal in FIG. 5, the base station BS in the embodiment illustrated in FIG. 6 comprises a receiver/transmitter combination Rx/TX, a measurement unit MU, a control unit CU, a processing unit CPU and a memory MEM.

The receiver/transmitter unit Rx/Tx is adapted to receive channel quality reports from one of more mobile terminals in the coverage area of the base station BS via, for example, CQIs (Channel Quality Indicators) and also to transmit control signals indicating a change of gating to one or more UEs. Likewise, the receiver/transmitter unit Rx/Tx is adapted to receive control signal indicating a change of gating from one or more UEs.

Analogously to the measurement unit in the mobile terminal in FIG. 5, the measurement unit MU of the base station BS is adapted to measure values indicative of the quality on the downlink radio channel by for example performing measurements of the signal attenuation or the number of correctly and erroneously received data units or by measuring the received signal strength and assuming it is similar to the received signal strength experienced by the same UE who transmitted the signal.

Using these values and/or the CQI received from one or more mobile terminals, the processing unit CPU of the base station BS may determine the current parameter value and compare it to a predefined target parameter value which is specific for the service currently used over the radio channel in order to adjust the gating activity on the downlink control channel. These adjustments are carried out in an identical way as described in FIG. 5 in the case of a mobile terminal with the difference that the processing unit may instruct the control unit CU of the base station BS to transmit control signals indicative of the change of gating activity to different UEs.

The memory MEM in the base station has identical functionality as the memory in the mobile terminal described in FIG. 5 and will therefore not be elaborated further.

Embodiments herein thus optimize transmission performance by adapting gating parameters. The gating parameters are adapted based on a measured criteria and a target value for this criteria. Furthermore, the embodiments are self tuning and avoid complicated mapping schemes between radio channel conditions, services and gating schemes. Also, the embodiments may improve the performance over the radio channel, since the gating scheme takes both the radio conditions and the particular application that is used into account and adapts the relevant gating parameters. Furthermore, methods herein-rapidly adjust to changes in radio conditions and application signaling behavior. In short, it will make the use of gating more efficient since it adapts in order to optimize current performance.

The invention claimed is:

1. A method for communication in a wireless communication network, the method comprising:
   selecting a parameter characterizing a service used on a radio channel in the wireless communication network;

selecting a target value of the parameter adapted for the service;
determining a current value of the parameter indicative of the current transmission conditions for the service on the radio channel;
comparing the current value to the target value;
adjusting an intensity of control signalling activity on a control channel associated with the service on the radio channel based on the comparison, wherein control signalling activity occurs periodically on the control channel in accordance with a selected one of a plurality of defined control signalling cycles, wherein said adjusting comprises, based on the comparison, at least one of:
  adjusting a length of the selected cycle, a burst length of a control signalling burst occurring during the selected cycle, an offset between a start of a control signalling burst occurring during the selected cycle and a start of a transmission on the radio channel, or a combination thereof; and
  switching between different ones of the defined control signalling cycles that have different lengths; and
transmitting information indicative of the adjustment of the intensity of the control signalling activity.

2. The method according to claim 1, further comprising also adjusting a preamble length for the selected control signalling cycle based on the comparison between the current value and the target value.

3. The method according to claim 1, further comprising determining a current control signalling cycle and adjusting the current control signalling cycle if a switch to a second control signalling cycle from an initial control signalling cycle has been made before the comparison of the current value to the target value.

4. The method according to claim 1, further comprising obtaining measurement values indicative of the conditions on the radio channel and calculating the current value based on the measurement values.

5. The method according to claim 1, wherein adjusting the intensity of the control signalling activity comprises adjusting gating of the control channel.

6. The method according to claim 1, wherein the control channel is separate from the radio channel.

7. The method according to claim 1, wherein said transmitting comprises transmitting said information on the control channel.

8. The method according to claim 1, wherein said adjusting comprises adjusting the intensity of control signalling activity that controls a power transmitted on the radio channel.

9. The method according to claim 1, wherein the target value of the parameter comprises one of a BLER (Block Error Rate), a BER (Bit Error Rate), a CIR (Carrier-to-Interference Ratio), an SIR (Signal-to-Interference Ratio), and an SINR (Signal-to-Interference and Noise Ratio).

10. A method for communication in a wireless communication network, the method comprising:
  selecting a parameter characterizing a service used over a radio channel in the wireless communication network;
  selecting a target value of the parameter adapted for the service;
  determining a current value of the parameter indicative of the current transmission conditions for the service on the radio channel;
  comparing the current value to the target value;
  adjusting an intensity of a signalling activity associated with the service on a separate control channel based on the comparison, wherein signalling activity occurs periodically on the separate control channel in accordance with a selected one of a plurality of defined signalling cycles, wherein said adjusting comprises, based on the comparison, at least one of:
    adjusting a length of the selected cycle, a burst length of a signalling burst occurring during the selected cycle, an offset between a start of a signalling burst occurring during the selected cycle and a start of a transmission on the radio channel, or a combination thereof; and
    switching between different ones of the defined signalling cycles that have different lengths; and
  transmitting information indicative of the adjustment of the intensity of the signal activity on the control channel.

11. A mobile terminal configured for communication in a wireless communication network, the mobile terminal comprising:
  a receiver/transmitter combination configured to transmit data related to a service on a radio channel in the wireless communication network;
  a measurement circuit configured to measure values indicative of the transmission conditions over the radio channel;
  a processing circuit configured to select a parameter characterizing the service, to determine a current value of the parameter based on measured values received from the measurement unit, and to compare the current value with a target value of the parameter that is specific for said service; and
  a control circuit configured, responsive to instructions from the processing unit, to adjust an intensity of control signalling activity on a control channel associated with the service on the radio channel based on said comparison, wherein control signalling activity occurs periodically on the control channel in accordance with a selected one of a plurality of defined control signalling cycles, wherein said adjusting comprises, based on the comparison, at least one of:
    adjusting a length of the selected cycle, a burst length of a control signalling burst occurring during the selected cycle, an offset between a start of a control signalling burst occurring during the selected cycle and a start of a transmission on the radio channel, or a combination thereof; and
    switching between different ones of the defined control signalling cycles that have different lengths.

12. The mobile terminal according to claim 11, further comprising a memory configured to store one or more target values associated with one or more services in the wireless communication network, and wherein the processing unit is configured to retrieve said target value associated with said service from the memory.

13. The mobile terminal according to claim 11, wherein adjusting the intensity of the control signalling activity comprises adjusting gating of the control channel.

14. The mobile terminal according to claim 11, wherein the control circuit is configured to adjust the intensity of control signalling activity that controls a power transmitted on the radio channel.

15. An infrastructure node configured for communication in a wireless communication network, the infrastructure node comprising:
  a receiver/transmitter combination configured to transmit data related to a service over a radio channel in the wireless communication network;
  a measurement unit configured to measure values indicative of the transmission conditions over the radio channel;

a processing unit configured to select a parameter characterizing the service, to determine a current value of the parameter based on measured values received from the measurement unit, and to compare the current value with a target value of the parameter that is specific for said service; and a control unit configured, responsive to instructions from the processing unit, to adjust an intensity of control signalling activity on a control channel associated with the service on the radio channel based on said comparison, wherein control signalling activity occurs periodically on the control channel in accordance with a selected one of a plurality of defined control signalling cycles, wherein said adjusting comprises, based on the comparison, at least one of:

adjustinq a length of the selected cycle, a burst length of a control signalling burst occurring during the selected cycle, an offset between a start of a control signalling burst occurring during the selected cycle and a start of a transmission on the radio channel, or a combination thereof; and switching between different ones of the defined control signalling cycles that have different lengths.

16. The infrastructure node according to claim 15, further comprising a memory configured to store one or more target values associated with one or more services in the wireless communication network, and wherein the processing unit is configured to retrieve said target value associated with said service from the memory.

17. The infrastructure node according to claim 15, wherein adjusting the intensity of the control signalling activity comprises adjusting gating of the control channel.

18. A computer program product stored in memory and comprising instruction sets that, when executed on a computer system, facilitate communication in a wireless communication network by causing the computer system to:

select a target value of a parameter associated with a service used over a radio channel in the wireless communication network;

determine a current value of the parameter indicative of the current transmission conditions on the radio channel;

compare the current value to the target value;

adjust an intensity of power control signalling on a control channel associated with the service based on the comparison, wherein power control signalling occurs periodically on the control channel in accordance with a selected one of a plurality of defined control signalling cycles, wherein said adjusting comprises, based on the comparison, at least one of:

adjusting a length of the selected cycle, a burst length of a control signalling burst occurring during the selected cycle, an offset between a start of a control signalling burst occurring during the selected cycle and a start of a transmission on the radio channel, or a combination thereof; and switching between different ones of the defined control signalling cycles that have different lengths; and communicate the adjustment of the intensity of power control signalling on a control channel.

* * * * *